United States Patent
Jones et al.

(10) Patent No.: US 7,099,950 B2
(45) Date of Patent: Aug. 29, 2006

(54) METHOD AND APPARATUS FOR USING XML FOR BOTH A PROTOCOL LAYER AND APPLICATION LAYER

(75) Inventors: Mark A. Jones, New Providence, NJ (US); Tony L. Hansen, South Amboy, NJ (US)

(73) Assignee: AT&T Corp., New York, NY (US)

( * ) Notice: Subject to any disclaimer, the term of this patent is extended or adjusted under 35 U.S.C. 154(b) by 904 days.

(21) Appl. No.: 09/800,767

(22) Filed: Mar. 8, 2001

(65) Prior Publication Data

US 2002/0026464 A1 Feb. 28, 2002

Related U.S. Application Data

(60) Provisional application No. 60/188,992, filed on Mar. 13, 2000.

(51) Int. Cl.
*G06F 13/42* (2006.01)

(52) U.S. Cl. .................. 709/230; 709/227; 709/228; 709/232; 709/246; 709/203; 704/275

(58) Field of Classification Search ............... 704/275; 709/230, 227, 228, 232, 246, 201, 203, 204, 709/205
See application file for complete search history.

(56) References Cited

U.S. PATENT DOCUMENTS 6,490,564 B1 * 12/2002 Dodrill et al. ............... 704/275
6,665,731 B1 * 12/2003 Kumar et al. ............... 709/246
6,772,216 B1 * 8/2004 Ankireddipally et al. ... 709/230

OTHER PUBLICATIONS

Jones, Mark. "The MASP XML Protocol", http://lists.w3.org/Archives/Public/xml-dist-app/2000May/0003.html. May 3, 2000.*

Using XML in the MASP Client–Server Protocol, http://www.research.att.com/-jones/www9paper.htm, pp. 1–13, dated Feb. 20, 2001, Mark A. Jones et al.

* cited by examiner

*Primary Examiner*—B. James Peikari

(57) ABSTRACT

A method and system for using XML for both a protocol layer and application data are described. The method comprises the steps of initiating a connection by a client to a server to form a session, responding by said server to said client indicating that said connection has been successfully completed, submitting a request by said client to said server for service, responding by said server to said client by providing said service and terminating the connection by said client. A session is maintained and a plurality of requests for service by a client and a server responds to those requests by providing the requested service or an error message. The session is maintained until all requests made by a client have been serviced and the requests made by a client may be either synchronous or asynchronous. The system comprises a client and a server coupled to said client by a communications link.

67 Claims, 4 Drawing Sheets

Requests that reference objects:

<search>     retrieve the attribute values for a set of objects that satisfy a filter
<retrieve> retrieve the attribute values for a specified resultset
<delete>     delete the objects that satisfy a filter
<modify>     change the attribute values for the objects that satisfy a filter
<count>     count the number of the objects that satisfy a filter
<create>     create a new object (in one substore) and expose it to the rest of the stores
<expose>     expose an already created object to the rest of the stores

Administrative requests:

<auth>     client turn in an authentication sequence
<list/>     list server data of various kinds
<help/>     return usage information

FIG. 3

General Error Response:

<error-response>     return an error from the corresponding request

Responses to requests that reference objects:

<search-response>     return a resultset containing the attributes
<retrieve-response> return a resultest containing the attributes
<delete-response>     return a resultset with the deleted object ids
<modify-response>     return a resultset for the modified objects
<count-response/>     return the number of objects that satisfied the filter
<create-response>     return a resultset with the new object
<expose-response>     return a resultset with the exposed objects

Administrative request responses:

<auth-response>     server response in an authentication protocol
<list-response>     server data that was requested
<help-response>     usage information

FIG. 4

METHOD AND APPARATUS FOR USING XML FOR BOTH A PROTOCOL LAYER AND APPLICATION LAYER

RELATED APPLICATION

The present application is related to U.S. Provisional No. 60/188,992 filed Mar. 13, 2000.

FIELD OF THE INVENTION

The present invention relates generally to client-server communications and specifically to use of an eXtensible Markup Language (XML)-based protocol.

BACKGROUND OF THE INVENTION

There have been a number of attempts recently to fashion XML client-server protocols in place of traditional ASCII protocols. The strength of ASCII protocols for network services such as SMTP, NNTP, and IMAP, is their relative simplicity. Debugging new implementations of such protocols is straightforward. It is convenient to be able to telnet to the appropriate port and manually enter commands to test the service or to "truss" the client or server and monitor the readable communication. "truss" is a Unix command that permits a user to "see" all system calls made by a process, the parameters passed by those call and any data or errors returned from those calls. That is, a user can "see" what their processes are "asking" Unix to do and the results of those requests making the "truss" command a very powerful debugging tool. On the other hand, an undesirable hallmark of these legacy protocols is their invention of ad hoc syntaxes for specifying requests and replies. This is particularly observed in their conventions for quoting meta-characters, dealing with for example line continuations, encoding binary data and handling error conditions.

SUMMARY OF THE INVENTION

The present invention was the result of a need for an application client to communicate with a database server in a session-oriented protocol. It was recognized that XML could be used to represent both the protocol layer and the application data. The simplicity of an ASCII/Unicode protocol is retained, while the above issues are resolved by a set of XML conventions and extensions for protocols. The core benefits of MASP and its implementation would carry over to the design of many client-server protocols.

MASP (Mediated Attribute Store Protocol) is comparable in form to synchronous, ASCII client-server protocols such as FTP, SMTP, NNTP, POP3 and IMAP. The syntax for each of these Internet protocols, however, is idiosyncratic and differs from the syntax of the payload. For example, SMTP/POP3 commands differ in format from the RFC-822 representation of the e-mail message payloads which they deliver/retrieve. The "dot-stuffing" operation even requires that the payload lines be altered to prevent confusion with the payload delimiter (a line with a single "." on it).

XML (Extensible Markup Language 1.0) has become the predominant representation language for Internet application data. By using an XML representation for the protocol as well as the embedded application data, MASP makes it easy to process both protocol and payload using a single parsing mechanism—an XML parser. Since XML parser implementations are ubiquitous across programming languages and platforms, the client and server protocol interfaces are almost universally adaptable. The protocol can also make full use of XML facilities for comments, XML namespaces, XML schema, the Unicode document character set, UTF-8 and UTF-16 character encoding forms, escaping conventions (e.g., CDATA). Traditional Internet protocols are not extensible for arbitrary comments and are restricted to ASCII encodings.

MASP is a session-oriented XML protocol. A session is represented by a pair of connections—a client-to-server connection that carries an ongoing XML document with client requests and a server-to-client connection that carries an ongoing XML document with server responses. The XML documents contain MASP commands that encompass payload data. There is no necessary connection between the MASP commands and the payload data and any particular conventions for programming language constructs, method calls, objects, data types, etc. This contrasts with other efforts such as XML-RPC to provide RPC (Remote Procedure Call) or SOAP (Simple Object Access Protocol) to provide object access in single-message-exchange (non-session-oriented) protocols.

It is, therefore, an object of the present invention to use XML as the underlying uniform language in a protocol stack. That is, to use a uniform language for both the session protocol (above socket connection) and for the data.

It is a further object of the present invention to develop a system in which the protocol is platform independent.

BRIEF DESCRIPTION OF THE DRAWINGS

The invention is best described with reference to the detailed description and the following figures, where:

FIG. 3 summarizes the elements that form client-generated requests for service.

FIG. 4 summarizes the corresponding server-generated response elements.

DETAILED DESCRIPTION OF THE PREFERRED EMBODIMENTS

Figure 1:
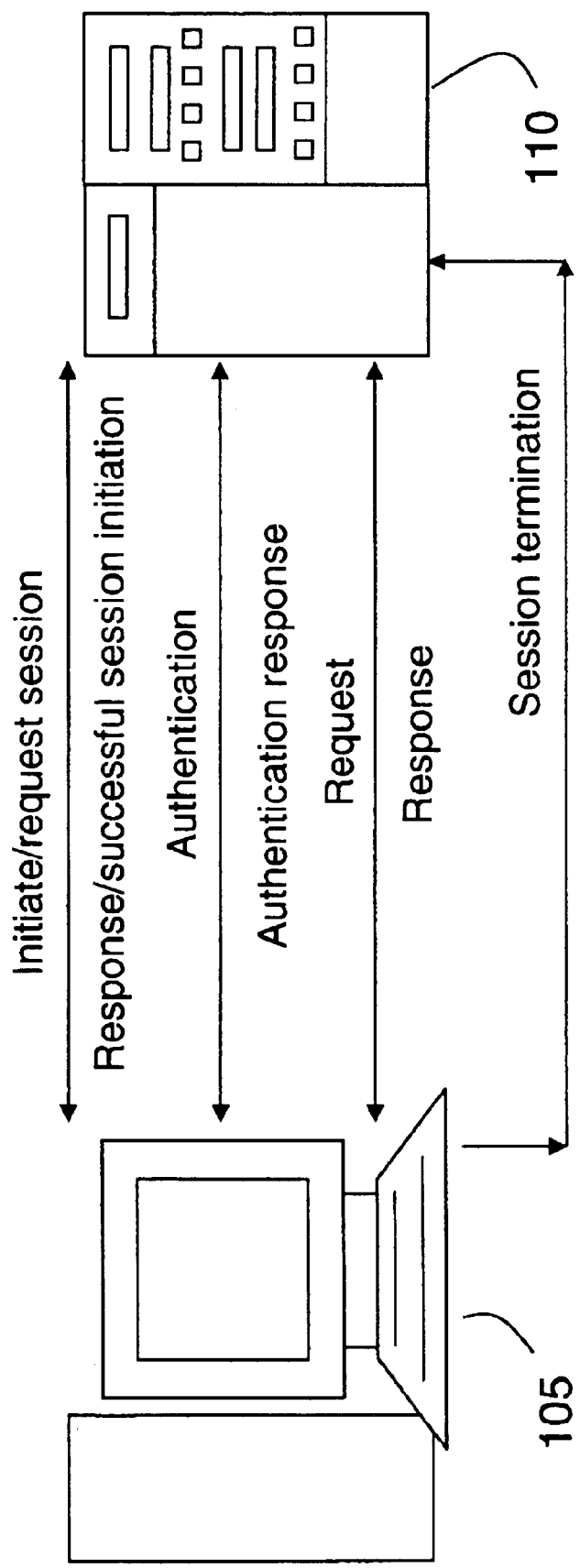
FIG. 1 depicts a block diagram of a simplified client-server arrangement where authentication occurs separately.

The present invention centers on a common or uniform form of client-server protocols—client requests with synchronous server responses. Further extensions of the ideas presented here will be required to handle, for example, more advanced protocols that allow asynchronous operations and incremental result reporting. Referring to FIG. 1, in which a client 105 communicates with a server 110, the important states in a synchronous client-server protocol are shown on FIG. 1 and include:

1. the initiation and successful completion of a connection from the client to the server to form a session 2. any necessary authentication and/or authorization credentials for subsequent services (some protocols may permit this action again at later times)

Figure 2:
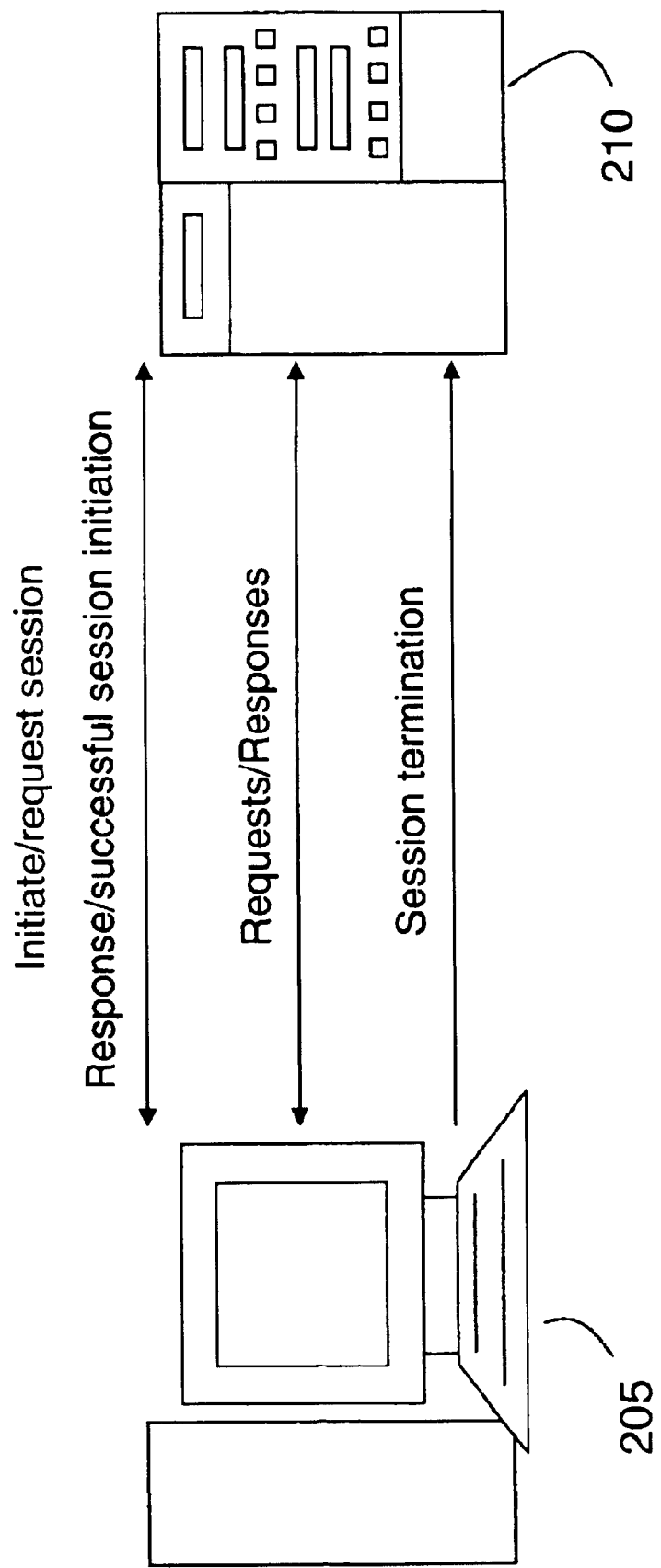
FIG. 2 is a simplified block diagram where authentication is a form of request/response.

3. the repeated submission of a request for service from the client, and a response from the server; such responses may also signal an error condition rather than an expected reply 4. the termination of the session and the connection between the client and the server By viewing the security exchanges as simply another type of request the above flow and exchanges can be significantly simplified as depicted in FIG. 2, in which a client 205 communicates with a server 210. In most applications, authentication will have to be performed in advance of other operations that depend on it, but this is similar to other types of protocol dependencies in which some operations need to be performed in advance of others. This logic is left to application-specific state machines and is not regarded as a syntactic protocol feature. That is, the authentication request and response are treated as a specific type of request and response. There may be certain other types of requests and responses that can, in fact, be handled or transacted prior to an authentication process. The simplified view of the synchronous client-server states are also shown in FIG. 2 and are as follows:

1. the initiation and successful completion of a connection from the client to the server to form a session 2. the repeated submission of a request for service from the client, and a response from the server; such responses may also signal an error condition rather than an expected reply 3. the termination of the session and the connection between the client and the server The implementation of the first step begins with instantiable code that exists in every systems programming language to create an appropriate socket connection. Once the connection is made, a session is created by having each side initiate an XML document. The client application can write XML directly to an opened socket connection or can use a library of functions (requests). The ongoing documents consisting of sequential requests and responses are incrementally interpreted and processed using an XML parser. The protocol and data (payload) are uniformly constructed in XML. No other base protocol is required save for TCP/IP. An augmented version of XML with meta-tags has been developed. The parser integrates the meta-tags with the application. Once such extremely useful meta-tag is EDATA, which stands for encoded data. This tag is used to handle binary data so the application will send and receive a string of bytes as CDATA or character data.

On each side of the connection, the XML documents are processed by a standard XML parser. A currently available non-validating XML parser is "expat XML Parser Toolkit", which was adapted for both the server and a C/C++ client library implementation. A validating XML parser can also be implemented and used. The client to server Document Type Definition (DTD or dtd) and server to client DTD are illustrated and described below. An attendant advantage in using DTDs is formal descriptions of the client and the server documents serve to describe both the protocol and the application data. This is useful in terms of validating the complete client-server interaction, for documentation, for error-recovery etc.

From the client side, the protocol document begins:
<?xml version="1.0"?>
<!DOCTYPE masp SYSTEM "client-server.dtd">
<client-session>

The first line specifies the version of XML being used. The second line has the document type declaration to define constraints on the logical structure and to support the use of predefined storage units. The second line also has the address (url reference) of the dtd for the document. An exemplary client-server dtd is shown in Table 1.

From the server side, the protocol document begins:
<?xml version="1.0"?>
<!DOCTYPE masp SYSTEM "server-client.dtd">
<!-- Enter <client-session>or <help/>. -->
<server-session>

The first line specifies the version of XML being used. The second line has the document type declaration to define constraints on the logical structure and to support the use of predefined storage units. The second line also has the address (url reference) of the dtd for the document. An exemplary server-client dtd is shown in Table 2.

The <client-session> and <server-session> tags are the root elements of the corresponding session documents. Closing a session simply amounts to terminating the client and server documents with the appropriate </client-session> and </server-session> end tags, respectively.

Optional attributes for the <client-session> could include client-host identification and other information that is global to the session. The <server-session> tag could similarly contain important status information regarding the server.

The dynamically generated protocol documents following the root element start tags consists of XML markup for client requests in the <client-session> document and the server responses in the <server-session> document. Although arbitrary markup can represent the requests and responses, the following conventions have been found to be valuable:

1. Each client request tag such as <search> is paired with either a server response tag such as <search-response> or by an <error-response> tag.

2. Each client request tag includes a unique id attribute, which is also carried in the corresponding server response. The id provides greater security in associating responses, even in a synchronous protocol.

3. The XML mechanism of "CDATA sections" or the EDATA tag must be used inside any element, which contains arbitrary character data that includes characters that are special to XML such as ampersand (&), less-than (<), and greater-than (>). By using XML as the basis for encoding requests and responses, and XML-based protocol can inherit the native XML facilities for delimiting and escaping and thus, avoid introducing ad hoc techniques.

The use of the id attribute is within the spirit of its usage in XML. Even though it is not directly XLinked by the server response, it is nonetheless intended as a pointer to content (a request) within the client document. The protocol handlers enforce the correspondence between the id's of the client and server documents.

FIG. 3 summarizes the elements that form client-generated requests for service.

FIG. 4 summarizes the corresponding server-generated response elements. The following is an example of a client search request and a successful server response:

```
<!-- client request -->
<search id='1'>
  <typedecl>user$u</typedecl>
  <filter><![CDATA[(last_name[$u]='Burnes')]]></filter>
  <select name='full_name [$u] '/>
  <select name='email[$u] '/>
</search>
<!-- server response -->
<search-response id='1'>
  
    <typedecl>user$u</typedecl>

<result>
        <ids>
          <id><EDATA encoding='qp'>hermod0000000102=
```

-continued

```
        </EDATA></id>
      </ids>
      <attrvals>
        <val ix='0' name='full_name [$u] '><EDATA
encoding='qp'>Susan Burnes=
</EDATA></val>
        <val ix='1' name='email [$u]'><EDATA
encoding='qp'>susan=40troy.research.att.com=
</EDATA></val>
      </attrvals>
    </result>
    <result>
      <ids>
        <id><EDATA encoding='qp'>hermod0000000324=
</EDATA></id>
      </ids>
      <attrvals>
        <val ix='0'><EDATA encoding='qp'>Walter Burnes=
</EDATA></val>
        <val ix='1'><EDATA
encoding='qp'>walt=40troy.research.att.com=
</EDATA></val>
      </attrvals>
    </result>

</search-response>
```

In the above example, the client is required to specify an identifier of the search, which is echoed by the server in its response. This is used as a means to keep track of requests and their associated responses. Character data is any string of characters that does not contain the start delimiters or the closing or end delimiters or any mark-up characters. The start of the character data is indicated by "<![CDATA", the character data follows, the end of the character data is indicated by "]]>". "attrvals" defines the attribute values and "nmtoken" defines a name token, which can be any mixture of name characters. "qp" stands for "quotable printable" and sets up line wrap at column 76.

Although there is no transaction management per se in MASP, some activities may require multiple client-server exchanges. For example, MASP uses the Simple Authentication and Security Layer (SASL) authentication mechanism, which permits complex multi-turn protocols. SASL is a method for adding authentication support to connection-based protocols. To authenticate a user (client) to a server there needs to be a command in the protocol to perform the authentication function. Options may include the ability to negotiate protection of subsequent interactions. Below is an example of a multi-turn SASL SCRAM-MD5 exchange:

```
<!-- client request, turn 1 -->
<auth id="1">
  <sasl method="SCRAM-MD5"><EDATA
encoding="base64">sh...89ef</EDATA></sasl>
</auth>
<!-- server response, turn 1 -->
<auth_response id="1">
  <sasl state="continue"><EDATA
encoding="base64">d34...dk355</EDATA></sasl>
</auth-response>
<!-- client request, turn 2 -->
<auth id="2" previd=1">
  <sasl><EDATA encoding="base64">1ko9...wek03</EDATA></sasl>
```

-continued

```
</auth>
<!-- server response, turn 2 -->
<auth_response id="2">
  <sasl state="ok"></sasl>
</auth-response>
```

A major task in many protocols, including MASP, is the marshalling of data between the endpoints. MASP includes a number of contexts such as the SASL payloads in the previous section in which relatively unrestricted byte sequences are to be transmitted. Other contexts contain more conventional character data, but may contain special XML characters such as "&". The XML CDATA mechanism is often useful for such cases, but it may not be guaranteed that the CDATA terminator]]> does not appear in a subsequence.

MASP provides a meta-tag, <EDATA>, that can be incorporated wherever arbitrary byte sequences need to appear. The processing of EDATA has been integrated directly into our XML parsers so that the data is decoded and spliced into the character stream exactly as other forms of PCDATA. The encoding attribute specifies the type of encoding provided. The implementation in the present invention currently supports base64, quoted-printable, "url" and "hex" encodings, and it can be easily extended to others. "base64" is an encoding scheme for Multipurpose Internet Mail Extensions (MIME), which encodes files and data as byte strings.

XML is well known for its verbosity. This property may serve it well when the goal is a readable, self-contained description for human consumption. In a protocol, however, it is not an advantage to consume far more bandwidth than necessary. There is a certain amount of obligatory overhead for packaging a structured data payload, and XML's syntactic overhead has been accepted for this purpose. At the expense of readability on the wire, one can perform data compression on the XML fragments if reducing that type of overhead is a real concern.

There is another kind of verbosity, descriptive repetition, for which MASP provides a solution. In the search example above, the response markup included two results. In the first result, the first appearance of a value for the $full_{13}name [\$u]$ attribute was coded as:

<val ix='0' name='$full_{13}$ name[\$u]'><EDATA encoding= 'qp'>Susan Burnes= </EDATA></val>

The attribute is fully described in its first appearance by the name attribute ($full_{13}name [\$u]$) and is also assigned an index (0) via the ix attribute. Subsequent references to this description can be obtained by simply including a reference to a prior ix attribute:

<val ix='0'><EDATA encoding='qp'>Walter Burnes= </EDATA></val>

The ix mechanism accomplishes for attributes roughly what the XML id accomplishes for elements, namely the ability to establish co-reference.

Error handling is a major concern in managing protocols. The primary issues are distinguishing various types of errors and error recovery. A large class of errors arises when the server detects an error when processing a syntactically valid request. This may be due to a semantically anomalous request, or a failure of the resources required by the server to carry out the requested operation, or a recoverable error in the server itself. In these cases, the server returns an appropriate <error-response>. For example, if the filter expression in the search example above is malformed:

```
<!-- client request -->
<search id='1'>
    <typedecl>user$u</typedecl>
    <filter><![CDATA[(last_name[$u] ='Burnes')]]></filter>
    <select name='full_name[$u] '/>
    <select name='email[$u]'/>
</search>
<!-- server response -->
<error-response id='1' permanence='permanent' errorcode='5'>
<![CDATA[Error parsing : parse error, column 22: '!'Bur...']]>
</error- response>
```

The permanence attribute indicates whether the error is permanent (not likely to help by simply trying again), or temporary (a resource problem that may later be resolved). The errorcode returns a specific error code that allows the client to take appropriate action. The body of the error response is human-readable text that gives additional information about the error.

Another class of errors arises due to invalid syntax in the client requests. This might occur because of a mistyping by a human, from a buggy client application, or due to communication errors in the network transport. These errors are caught by the server's XML parser. For example, suppose that inside the search request, the <typedecl> had been misspelled as <typedelc>:

```
<!-- client request -->
<search id='1'>
    <typedelc>user$u</typedecl>
    <filter><![CDATA[(last_name [$u]='Burnes')]]></filter>
    <select name='full_name [$u] '/>
    <select name='email[$u] '/>
</search>
<!-- server response --->
<error-response id='1' permanence='permanent' errorcode='12'>
<![CDATA[mismatched tag at line 1]]>
</error-response>
```

With a little cleverness, the server protocol engine is able to recover by resetting the XML parser and initiating the start of a new client document (<client-session>). Other types of errors involve detecting loss of service. A connection loss to the server from a client can be managed by re-tries and starting a new client document. Other situations may require techniques such as timeouts and "keep-alives", which are not currently used.

One non-obvious and serendipitous side effect of using XML as a protocol language is that fact that XML comments can easily be ignored by most XML parsers. Comments may be freely interspersed to provide prompts, help, server or protocol or application-level debugging information and application specific comments. Comments can be observed in socket level debugging tools but are automatically ignored by the XML-parser. This turns out to extremely useful, especially for debugging servers. They can produce debugging information in commented form right along with the normal XML responses without interrupting the normal client behavior. Thus, a tool such as the Unix truss utility can monitor the client or server I/O activity and get a good picture of what is going on even while the server is in "normal" operation. This has been so useful that a debuglevel attribute is utilized on many of the client requests that trigger the server to drop varying degrees of debugging information into the server document in the form of XML comments. This is a feature not readily available in most ad hoc ASCII protocols.

A number of related efforts use XML for carrying application-specific payloads over a non-XML protocol encoding, typically HTTP. For example, the ICE/HTTP variant of the Information and Content Exchange (ICE) Protocol uses the HTTP POST/Response mechanism to transmit XML payloads to support content syndicators and their subscribers.

XML payloads can also directly support programming models. XML-RPC is a specification for remote procedure calling using HTTP as the transport and XML as the encoding. The Simple Object Access Protocol (SOAP) is an Internet draft proposal for making remote method calls on objects. In contrast, MASP uses XML uniformly for protocol and payload. MASP XML payloads are abstract, intentional requests for service, rather like the idea of abstract markup for text processing; they do not necessarily correspond to particular coding constructs in the client or server.

MASP has been described as an XML-based client-server protocol. XML offers a standard set of mechanisms for representing structured data, and there are many high-quality XML parsers that are now available. DTD's (or the XML schemas currently under development by the World Wide Web Consortium (W3C)) present a clear picture of the client and server protocol syntax, and, especially with a validating parser, can enforce very precise syntactic requirements. The MASP extensions and conventions presented herein further form a very useful protocol substrate.

Flexibility in adding or changing a protocol is particularly important when designing new services. This is an area where the XML approach really stands out. It is a very simple matter to modify the DTD's, change a dispatch table in the code, and test a new feature or command; it is certainly much easier than modifying ad hoc parsing code or a Yet Another Compiler Compiler (YACC) grammar. YACC is a meta-language for building compilers used on Unix.

In fact, this flexibility invites software re-use as well. It is intended to make the MASP implementation available to others who want to experiment with XML protocols. Most of the features that are described herein for turn-taking, escaping and encoding mechanisms, error handling, attribute repetition, debugging and session management would be generally useful for many protocols.

TABLE 1

Client-to-Server DTD

```
<?xml version="1.0" encoding="UTF-8"?>
<!--
This is the client-to-server MASP (Mediated Attribute Store
Protocol) dtd.
Representational guidelines:
*    Each request in the session has an 'id' attribute generated
     by the client. The server will attach this 'id' to the
     responses that it generates.
* Request control options should be handled as attributes.
#REQUIRED means that the attribute must be specified for all
elements of the type in the attribute list declaration. "|" means
"or".
* Request data options should be handled as elements.
-->
<!ELEMENT client-session
    (auth |
    count |
    create |
    delete |
    expose |
    help |
    list |
```

TABLE 1-continued

Client-to-Server DTD

```
    modify |
    retrieve |
    search) *>
<!ATTLIST client-session client-host NMTOKEN #IMPLIED>
<!-- authenticate a user
<!ELEMENT auth (sasl)>
<!ATTLIST auth id ID #REQUTRED
    previd ID #IMPLIED
    debuglevel NMTOKEN #IMPLIED>
<!ELEMENT sasl (#PCDATA | EDATA)*>
<!ATTLIST sasl method NMTOKEN #IMPLIED>
<!-- for the tuples that satisfy the filter,
    count the number of tuples
-->
<!ELEMENT count (typedecl, filter)>
<!ATTLIST count id ID #REQUIRED
    debuglevel NMTOKEN #IMPLIED>
<!-- create a new object with the declared type,
    and add the attribute values
-->
<!ELEMENT create (typedecl, filter, mod*, select*)>
<!ATTLIST create id ID #REQUIRED
    debuglevel NMTOKEN #IMPLIED>
<!-- for the 1-tuples that satisfy the filter
    (over exactly one variable),
    delete the objects
-->
<!ELEMENT delete (typedecl, filter)>
<!ATTLIST delete id ID #REQUIRED
    debuglevel NMTOKEN #IMPLIED>
<!-- expose a new object with the declared type,
    typeid and attribute values (if any)
-->
<!ELEMENT expose (typedecl, filter, mod*, select*)>
<!ATTLIST expose id ID #REQUIRED
    debuglevel NMTOKEN #IMPLIED>
<!-- help
-->
<!ELEMENT help EMPTY>
<!ATTLIST help id ID #REQUIRED
    debuglevel NMTOKEN #IMPLIED>
<!-- list
-->
<!ELEMENT list EMPTY>
<!ATTLIST list id ID #REQUIRED
    show (signatures | sasl-mechanisms) #REQUIRED
    debuglevel NMTOKEN #IMPLIED>
<!-- for the tuples that satisfy the filter,
either add the value            (set union on the attr
                                values or relation instances),
or delete the value             (set difference on the attr
                                values or relation instances)
or replace the value(s)         (replace any existing attr
                                values or relation instances
                                with the value)
-->
<!ELEMENT modify (typedecl, filter, mod*, select*)>
<!ATTLIST modify id ID #REQUIRED
    states (no | yes) "no"
    debuglevel NMTOKEN #IMPLIED>
<!-- for the tuples in the resultset,
    select attributes
-->
<!ELEMENT retrieve (resultset, select*)>
<!ATTLIST retrieve id ID #REQUIRED
    states (no | yes) "no"
    debuglevel NMTOKEN #IMPLIED>
<!ELEMENT resultset (typedecl, results)>
<!ELEMENT typedecl (#PCDATA | EDATA)*>
<!ELEMENT results (result*)>
<!ATTLIST results count NNTOKEN #REQUIRED>
<!ELEMENT result (ids, states?, attrvals?)>
<!ELEMENT ids (id+)>
<!ELEMENT id (#PCDATA | EDATA)*>
<!ELEMENT states (state*)>
<!ELEMENT state (#PCDATA | EDATA)*>
<!ATTLIST state ix NNTOKEN #IMPLIED
    name CDATA #IMPLIED>
<!ELEMENT attrvals (val*)>
<!ATTLIST attrvals ix NMTOKEN #IMPLIED
    name CDATA #IMPLIED>
<!ELEMENT val (#PCDATA | EDATA)*>
<!-- for the tuples that satisfy tfilter,
    select attributes
-->
<!ELEMENT search (typedecl, filter, select*)>
<!ATTLIST search id ID #REQUIRED
    states (no | yes) "no"
    debuglevel NMTOKEN #IMPLIED>
<!-- common elements -->
<!ELEMENT filter (#PCDATA | EDATA)*>
<!ELEMENT select EMPTY>
<!ATTLIST select ix NMTOKEN #IMPLIED
    name CDATA #IMPLIED>
<!ELEMENT mod (#PCDATA EDATA) *>
<!ATTLIST mod op (add | delete | replace) "add"
    ix NMTOKEN #IMPLIED
    name CDATA #IMPLIED>
<!ELEMENT EDATA (#PCDATA)>
<!ATTLIST EDATA encoding
    (base64 | b64 | quoted-printable | qp | url |
hex)
    #IMPLIED>
```

TABLE 2

Server-to-Client DTD

```
<?xml version="1.0" encoding="UTF-8"?>
<?xml version="1.0" encoding="UTF-8"?>
<!--
This is the dtd for the Hermod Attribute Stare
server-to-client communication protocol.
Representational guidelines:
*   Each response returned from the server contains an 'id' that
    corresponds to the 'id' that the client attached to the
    corresponding request.
*   Response control options and counts should be handled as
    attributes. #REQUIRED means that the attribute must be
    specified for all elements of the type in the attribute list
    declaration. "|" means "or".
*   Response data should be handled as elements.
-->
<!ELEMENT server-session
    (auth-response |
    count-response |
    create-response |
    delete-response |
    error-response |
    expose-response |
    help-response |
    list-response |
    modify-response |
    retrieve-response |
    search-response) *>
<!ELEMENT auth-response (sasl)>
<!ATTLIST auth-response id ID #REQUIRED>
<!ELEMENT sasl (#PCDATA I EDATA)*>
<!ATTLIST sasl state NMTOKEN #REQUIRED>
<!ELEMENT count-response EMPTY>
<!ATTLIST count-response id ID #REQUIRED
    count NMTOKEN #REQUIRED>
<!ELEMENT create-response (resultset)>
<!ATTLIST create-response id ID #REQUIRED>
<!ELEMENT delete-response (resultset)>
<!ATTLIST delete-response id ID #REQUIRED>
<!ELEMENT error-response (#PCDATA | EDATA)*>
<!ATTLIST error-response id ID #REQUIRED
    permanence NMTOKEN "permanent">
```

TABLE 2-continued

Server-to-Client DTD

```
<!ELEMENT expose-response (resultset)>
<!ATTLIST expose-response id ID #REQUIRED>
<!ELEMENT help-response (#PCDATA | EDATA)*>
<!ATTLIST help-response Id ID #REQUIRED>
<!ELEMENT list-response (signatures | sasl-mechanisms)>
<!ATTLIST list-response id ID #REQUIRED>
<!ELEMENT signatures (sig)*>
<!ELEMENT sig (#PCDATA | EDATA)*>
<!ELEMENT sasl-mechanisms (mechanism)*>
<!ELEMENT mechanism (#PCDATA | EDATA)*>
<!ELEMENT modify-response (resultset)>
<!ATTLIST modify-response id ID #REQUIRED>
<!ELEMENT retrieve-response (resultset)>
<!ATTLIST retrieve-response id ID #REQUIRED>
<!ELEMENT search-response (resultset)>
<!ATTLIST search-response id ID #REQUIRED>
<!-- common elements -->
<!ELEMENT resultset (typedecl, results)>
<!ELEMENT typedecl (#PCDATA | EDATA)*>
<!ELEMENT results (result*)>
<!ATTLIST results count NMTOKEN #REQUIRED>
<!ELEMENT result (ids, states?, attrvals?)>
<!ELEMENT ids (id+)>
<!ELEMENT id (#PCDATA | EDATA)*>
<!ELEMENT states (state*)>
<!ELEMENT state (#PCDATA | EDATA)*>
<!ATTLIST state ix NMTOKEN #IMPLIED
      name CDATA #IMPLIED>
<!ELEMENT attrvals (val*)>
<!ATTLIST attrvals ix NMTOKEN #IMPLIED
      name CDATA #IMPLIED>
<!ELEMENT val (#PCDATA | EDATA)*>
<!ELEMENT EDATA (#PCDATA)>
<!ATTLIST EDATA encoding
      (base64 | b64 | quoted-printable | qp | url | hex)
      #IMPLIED>
```

The synchronous XML-based protocol described herein can be extended to provide asynchronous operation. In the context of the present invention, synchronous operation refers to the response by the server being paired directly with requests initiated by the client with ordering preserved. An extension whereby responses by the server are returned in an order different from the order of the requests initiated by the client is possible. The already defined "id" can be used to pair up or match requests with responses. This could be further extended to permit responses to be generated in pieces, where the pieces could be further given serial numbers as well as an "id" number. This may prove useful in the event that the pieces of a response were delivered out of order and required reordering. The "final" piece of a response could be marked as "final" so that the client would know that the response was complete and the response could be reordered if necessary.

The principal advantage of asynchronous operation is to allow multiple commands to be processed in parallel, particularly, when the server is multi-threaded and some requests take longer to process than others. A mechanism may also be required to handle instances where some requests need to be processed before others, in other words instances where there may be a priority or hierarchy for some requests.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. A method for using XML for both a protocol layer and application data, the protocol layer and application data having an XML-based structure, the method comprising:
   initiating a connection by a client to a server by initiating a first XML document and writing said first XML document directly to a TCP/IP socket connection;
   responding by said server to said client by initiating a second XML document so as to indicate that said connection has been established;
   receiving a request from said client at said server for service;
   responding by said server to said client by providing said service; and
   terminating the connection by said client.

2. The method according to claim 1, wherein said connection is a socket connection formed using TCP/IP.

3. The method according to claim 1, wherein said receiving step comprises a preliminary step of said client submitting a request to said server for service.

4. The method according to claim 3, wherein said submitting step and said second responding step are repeated a plurality of times until all requests for service by said client have been satisfied with responses by said server.

5. The method according to claim 4, wherein after a first occurrence of said submitting step and a first occurrence of said second responding step, said submitting step and said second responding step occur asynchronously.

6. The method according to claim 5, wherein said connection is created by said client initiating said first XML document and said server responding by initiating said second XML document.

7. The method according to claim 6, wherein:
   said first and second XML documents are ongoing and
   said ongoing XML documents are incrementally interpreted and processed using an XML parser.

8. The method according to claim 7, wherein XML has been augmented to include meta-tags.

9. The method according to claim 7, wherein said request for service submitted by said client has a client request tag.

10. The method according to claim 9, wherein said response to said client, for said request for service, by said server has a response tag that corresponds to said client request tag.

11. The method according to claim 10, wherein said responses by said server satisfying said requests for service by said client are matched with each other by a correspondence between said client request tag and said response tag.

12. The method according to claim 3, wherein an authentication process is handled by said submitting step and said second responding step.

13. The method according to claim 12, wherein said authentication process further comprises the steps of negotiating protection of subsequent transaction using said submitting step and said second responding step.

14. The method according to claim 3, wherein said second responding step is an error response.

15. The method according to claim 14, wherein said error response is permanent.

16. The method according to claim 15, wherein said permanent error response is the result of one of:
   a mistyping of a request,
   an incorrect client application and
   a communications error.

17. The method according to claim 14, wherein said error response is temporary.

18. The method according to claim 17, wherein said temporary error response is the result of one of:
   a semantically anomalous request,
   a failure of resources required by said server to carry out the request by said client and
   a recoverable error in the server.

19. The method according to claim 3. wherein said XML is compressed in order to reduce overhead.

20. The method according to claim 1, wherein said first XML document is written using a library of functions.

21. The method according to claim 1, wherein:
   said first and said second XML documents are ongoing and
   said ongoing XML documents are incrementally interpreted and processed using an XML parser.

22. The method according to claim 21, wherein XML has been augmented to include meta-tags.

23. The method according to claim 22, wherein said meta-tags are used to encode arbitrary byte sequences.

24. The method according to claim 21, wherein said request for service submitted by said client has a client request tag.

25. The method according to claim 24, wherein said response to said client, for said request for service, by said server has a response tag that corresponds to said client request tag.

26. The method according to claim 24, wherein said response to said client, for said request for service, by said server has an error response tag that corresponds to said client request tag.

27. The method according to claim 24, wherein said client request tag has a unique identifier attribute.

28. The method according to claim 27, wherein said unique identifier attribute used in said client request tag is carried in said response tag forwarded by said server to said client.

29. The method according to claim 27, wherein said unique identifier attribute used in said client request tag is carried in said error response tag forwarded by said server to said client.

30. The method according to claim 21, wherein XML is augmented to handle descriptive verbosity by using an index, wherein said index establishes a co-reference to an already fully described attribute.

31. The method according to claim 21, wherein said XML parser ignores XML comments.

32. The method according to claim 31, wherein said XML comments are debugging comments.

33. The method according to claim 32, wherein said debugging comments can be used to monitor activity of said client and activity of said server.

34. A system for using XML for both a protocol layer and application data, the protocol layer and application data having an XML-based structure, the system comprising:
   a client, configured to initiate a connection over a communications link to a server by initiating a first XML document and writing said first XML document directly to a TCP/IP socket connection; and
   the server, configured to respond to said client by initiating a second XML document so as to indicate that said connection has been established.

35. The system according to claim 34, wherein once said connection is established, ongoing communications occur over said communications link by:
   said client submitting requests to said server for service,
   said server receiving requests for service from said client and
   said server responding to said requests for service.

36. The system according to claim 35, wherein said server responds to said client with an error response.

37. The system according to claim 36, wherein said error response is permanent.

38. The system according to claim 37, wherein said permanent error response is the result of one of:
   a mistyping of a request,
   an incorrect client application and
   a communications error.

39. The system according to claim 36, wherein said error response is temporary.

40. The system according to claim 39, wherein said temporary error response is the result of one of:
   a semantically anomalous request,
   a failure of resources required by said server to carry out the request by said client and
   a recoverable error in the server.

41. The system according to claim 35, wherein said request for service submitted by said client has a client request tag.

42. The system according to claim 41, wherein said response to said client, for said request for service, by said server has a response tag that corresponds to said client request tag.

43. The system according to claim 41, wherein said response to said client, for said request for service, by said server has an error response tag that corresponds to said client request tag.

44. The system according to claim 41, wherein said client request tag has a unique identifier attribute.

45. The system according to claim 44, wherein said unique identifier attribute used in said client request tag is carried in said response tag forwarded by said server to said client.

46. The system according to claim 44, wherein said unique identifier attribute used in said client request tag is carried in said error response tag forwarded by said server to said client.

47. The system according to claim 35, wherein after a first occurrence of said client submitting said requests to said server for service, said requests for service and responses by said server to said requests for service occur asynchronously.

48. The system according to claim 47, wherein said connection is created by said client initiating said first XML document and said server responding by initiating said second XML document.

49. The system according to claim 48, wherein:
   said first and second XML documents are ongoing and
   said ongoing XML documents are incrementally interpreted and processed using an XML parser.

50. The system according to claim 49, wherein XML has been augmented to include meta-tags.

51. The system according to claim 47, wherein said request for service submitted by said client has a client request tag.

52. The system according to claim 51, wherein said response to said client, for said request for service, by said server has a response tag that corresponds to said client request tag.

53. The system according to claim 52, wherein said responses by said server satisfying said requests for service by said client are matched with each other by a correspondence between said client request tag and said response tag.

54. The system according to claim 34, wherein said client terminates said connection to said server.

55. The system according to claim 34, wherein said connection is a socket connection formed using TCP/IP.

56. The system according to claim 34, wherein an authentication process is handled by said client submitting a request for authentication and said server responding successfully to said request for authentication.

57. The system according to claim 34, wherein said first XML document is written using a library of functions.

58. The system according to claim 34, wherein:
said first and said second XML documents are ongoing and
said ongoing XML documents are incrementally interpreted and processed using an XML parser.

59. The system according to claim 58, wherein XML has been augmented to include meta-tags.

60. The system according to claim 58, wherein said meta-tags are used to encode arbitrary byte sequences.

61. The system according to claim 58, wherein XML is augmented to handle descriptive verbosity by using an index, wherein said index establishes a co-reference to an already fully described attribute.

62. The system according to claim 58, wherein said XML parser ignores XML comments.

63. The system according to claim 62, wherein said XML comments are debugging comments.

64. The system according to claim 63, wherein said debugging comments can be used to monitor activity of said client and activity of said server.

65. The system according to claim 34, wherein said authentication process further comprises negotiating protection of subsequent transaction by said client submitting further requests for service and receiving successful responses from said server.

66. The system according to claim 34, wherein said XML is compressed in order to reduce overhead.

67. A system for using XML for both a protocol layer and application data, the protocol layer and application data having an XML-based structure, the system comprising:
means for initiating a connection by a client to a server by initiating a first XML document and writing said first XML document directly to a TCP/IP socket connection;
means for responding by said server to said client by initiating a second XML document so as to indicate that said connection has been established;
means for submitting a request by said client to said server for service;
means for receiving said request for service from said client at said server;
means for responding by said server to said client by providing said service; and
means for terminating the connection by said client.

* * * * *